United States Patent
Zou et al.

(10) Patent No.: US 11,943,058 B2
(45) Date of Patent: **\*Mar. 26, 2024**

(54) METHODS OF RETRANSMISSION IN SEMI-PERSISTENT SCHEDULING WITHOUT EXPLICIT HARQ FEEDBACK

(71) Applicant: Telefonaktiebolaget LM Ericsson (publ), Stockholm (SE)

(72) Inventors: Zhenhua Zou, Solna (SE); Ali Behravan, Stockholm (SE); Daniel Chen Larsson, Lund (SE); Gustav Wikström, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/985,749

(22) Filed: Nov. 11, 2022

(65) Prior Publication Data

US 2023/0074024 A1   Mar. 9, 2023

Related U.S. Application Data

(63) Continuation of application No. 16/481,522, filed as application No. PCT/IB2018/050741 on Feb. 6, 2018, now Pat. No. 11,502,784.

(Continued)

(51) Int. Cl.
*H04L 1/1812* (2023.01)
*H04L 1/1607* (2023.01)
(Continued)

(52) U.S. Cl.
CPC .......... *H04L 1/1812* (2013.01); *H04L 1/1657* (2013.01); *H04L 1/1864* (2013.01); *H04L 1/188* (2013.01); *H04L 1/1896* (2013.01)

(58) Field of Classification Search
CPC ... H04L 1/1812; H04L 1/1657; H04L 1/1864; H04L 1/188
See application file for complete search history.

(56) References Cited

U.S. PATENT DOCUMENTS

| | | | |
|---|---|---|---|
| 11,502,784 B2* | 11/2022 | Zou | H04L 1/1864 |
| 2007/0076639 A1* | 4/2007 | Chou | H04L 41/0213 370/310 |

(Continued)

FOREIGN PATENT DOCUMENTS

| | | |
|---|---|---|
| CN | 101286792 A | 10/2008 |
| CN | 104170508 A | 11/2014 |

OTHER PUBLICATIONS

Ericsson, "Semi-Persistent Scheduling for NR", 3GPP TSG-RAN1 Meeting #88-Bis, Spokane, USA, Apr. 3, 2017, pp. 1-3, R1-1706052, 3GPP.

(Continued)

*Primary Examiner* — Raj Jain
(74) *Attorney, Agent, or Firm* — COATS & BENNETT, PLLC

(57) ABSTRACT

Example techniques for data retransmission in systems that do not utilize explicit hybrid automatic repeat request (HARQ) feedback are presented, including an example method by a wireless device that includes starting a timer for a hybrid automatic repeat request (HARQ) process associated with a transport block (TB) transmission by the wireless device to the network node. The method includes identifying a HARQ policy for the HARQ process, the HARQ policy governing whether the wireless device is to retransmit the TB or transmit a new TB where no HARQ feedback responsive to the TB transmission is received from the network node before the timer expires. Furthermore, the method includes retransmitting the TB or transmitting the new TB according to the HARQ policy at a next periodic (Continued)

transmission occasion for the HARQ process after the timer expires. Methods at a network node and related apparatuses and computer programs are also presented.

18 Claims, 7 Drawing Sheets

Related U.S. Application Data

(60) Provisional application No. 62/476,641, filed on Mar. 24, 2017.

(51) Int. Cl.
*H04L 1/1829* (2023.01)
*H04L 1/1867* (2023.01)

(56) References Cited

U.S. PATENT DOCUMENTS

| | | | | |
|---|---|---|---|---|
| 2008/0273520 | A1* | 11/2008 | Kim | H04W 28/24 370/310 |
| 2009/0319850 | A1* | 12/2009 | Baek | H04L 1/1874 714/E11.131 |
| 2010/0313095 | A1 | 12/2010 | Dinan | |
| 2010/0322172 | A1* | 12/2010 | Hsu | H04L 1/1822 370/329 |
| 2012/0257559 | A1* | 10/2012 | Kim | H04W 74/085 370/311 |
| 2013/0235768 | A1 | 9/2013 | Earnshaw et al. | |
| 2014/0018085 | A1* | 1/2014 | Young | H04W 76/27 455/450 |
| 2014/0281781 | A1 | 9/2014 | Terry | |
| 2015/0351133 | A1* | 12/2015 | Zhang | H04W 74/0833 370/336 |
| 2016/0173237 | A1* | 6/2016 | Braun | H04L 1/0076 370/242 |
| 2018/0145798 | A1* | 5/2018 | Suzuki | H04L 43/0864 |
| 2019/0053322 | A1* | 2/2019 | Wu | H04W 76/28 |
| 2019/0386780 | A1* | 12/2019 | Zou | H04L 1/1657 |
| 2023/0074024 | A1* | 3/2023 | Zou | H04L 1/1896 |

OTHER PUBLICATIONS

Ericsson, "HARQ Handling for SPS UL", 3GPP TSG-RAN WG2 #97bis, Spokane, USA, Apr. 3, 2017, pp. 1-3, R2-1702666, 3GPP.

* cited by examiner

METHODS OF RETRANSMISSION IN SEMI-PERSISTENT SCHEDULING WITHOUT EXPLICIT HARQ FEEDBACK

RELATED APPLICATION

The present application is a continuation of U.S. patent application Ser. No. 16/481,522, which was filed on Jul. 29, 2019, which is a national stage application of PCT/162018/050741, which was filed on Feb. 6, 2018, and claims benefit of U.S. Provisional Application 62/476,641, which was filed on Mar. 24, 2017, the disclosures of each of which are incorporated herein by reference in their entirety.

TECHNICAL FIELD

The subject matter of the present application relates generally to wireless communications. More specifically, the subject matter concerns techniques for data retransmission in Fifth Generation (5G) wireless communication systems.

BACKGROUND

In Long-Term Evolution (LTE), resources for uplink (UL) transmissions are granted by a network node (e.g., a base station, Evolved Node B (eNB), Next Generation Node B (gNB), etc.) This grant scheduling procedure can be done dynamically, such as when a network node schedules the UL transmission per transmission time interval (TTI). Alternatively, a semi-persistent scheduling (SPS) framework can be utilized. When SPS is utilized, uplink grants for multiple TTIs are transmitted to the wireless device at some point prior to a data transmission. The configuration of SPS includes an indication regarding the periodicity of the grant, the allocations, and modulation and coding scheme (MCS) for subsequent SPS occasions related to the grant.

Another associated concept in wireless transmission is data retransmission. When the transmission of data fails due to some errors in the channel that cannot be fixed in the decoding, the receiver may request that the transmitter retransmit the data, for instance, using a HARQ process. The retransmission method may simply be transmitting the same data or a better coded data, with lower rate, for example. At the receiver side, the receiver may simply use the new retransmitted data instead of the initially transmitted data or may combine them to make a more reliable detection.

LTE uses a synchronous HARQ concept where an acknowledgement of correctly received data (ACK) or a negative acknowledgement of an erroneous detection (NACK) is sent by the receiver to the transmitter at a certain time over a Physical Hybrid-ARQ Indicator Channel (PHICH). In LTE, a wireless device (also referred to herein as a user equipment (UE)) uses the same HARQ process number every eight TTIs. Correspondingly, retransmission of the data, if needed, occurs every eight TTIs using the same HARQ process number as the original transmission. Since the UE uses a specific HARQ process ID at a specific subframe, the network node (also referred to herein as a base station, eNB, gNB, or the like) is able to identify individual HARQ processes and cross-reference each retransmission with its original transmission through the HARQ ID.

When considering the New Radio (NR) for 5G, it has been agreed that similar principles to those of SPS and HARQ should be adopted. Specifically, at least semi-static resource (re-)configuration is supported as a grant-free framework, which is similar to the Semi-Persistent Scheduling (SPS) and fast uplink access in LTE in which the transmission opportunities are pre-configured with a periodicity. The UL HARQ process in 5G aims to be asynchronous in design, which means that an ACK or NACK can be transmitted sporadically, thus rendering HARQ feedback timing unpredictable. In LTE-SPS, network nodes allocate PHICH for each configured SPS UL grant. Since the HARQ is synchronous, only one PHICH is allocated for sending the necessary explicit HARQ feedback signals from a receiver to the transmitter. With asynchronous HARQ, however, many PHICH channels would be required, and NR does not provide these channels or a mechanism for their creation. Thus, because NR is to use UL semi-persistent scheduling without explicit HARQ feedback, a UE implementing NR protocols will not be able to determine whether it should send a new data packet according to the SPS period or it should send a retransmission of the previous packet. Therefore, solutions to solve the problems resulting from this ambiguity are needed, as the resulting uncertainty regarding what is to be transmitted by the UE in NR could cause acute performance and reliability degradation on a per-UE as well as a system-wide scale.

SUMMARY

The present disclosure describes example techniques for data retransmission in systems that do not utilize explicit HARQ feedback, such as those implementing SPS or similar scheduling paradigms. For instance, the present disclosure describes an example method performed by a network node for managing wireless data transmissions (e.g., in a transport block (TB) having an associated HARQ process ID) by a wireless device to the network node at periodic transmission occasions. In an aspect, this example method may include configuring a timer for a HARQ process associated with the TB transmission by the wireless device to the network node. In addition, the example method may include identifying a HARQ policy for the HARQ process. In an aspect, the HARQ policy can govern whether the wireless device is to retransmit the TB or transmit a new TB to the network node in situations where no HARQ feedback responsive to the TB transmission is received from the network node before the timer expires. Furthermore, the example method includes receiving a retransmitted TB or a new TB according to the HARQ policy at a next periodic transmission occasion for the HARQ process after the timer expires.

In addition to the method performed by the network node introduced above, the present disclosure also offers a method performed by a wireless device (e.g., user equipment) for managing TB transmissions by the wireless device to a network node at periodic transmission occasions. This example method may include starting a timer for a HARQ process associated with the TB transmission by the wireless device to the network node. In addition, the example method can include identifying a HARQ policy for the HARQ process. Like the example network node method above, the HARQ policy of the can govern whether the wireless device is to retransmit the TB or transmit a new TB in situations where no HARQ feedback responsive to the TB transmission is received from the network node before the timer expires. Furthermore, the example method can include the wireless device retransmitting the TB or transmitting the new TB according to the HARQ policy at a next periodic transmission occasion for the HARQ process after the timer expires.

Embodiments herein also include corresponding apparatus, computer programs, and carriers (e.g., computer program products), as well as network-side aspects performed by a network node.

DETAILED DESCRIPTION

Figure 1:
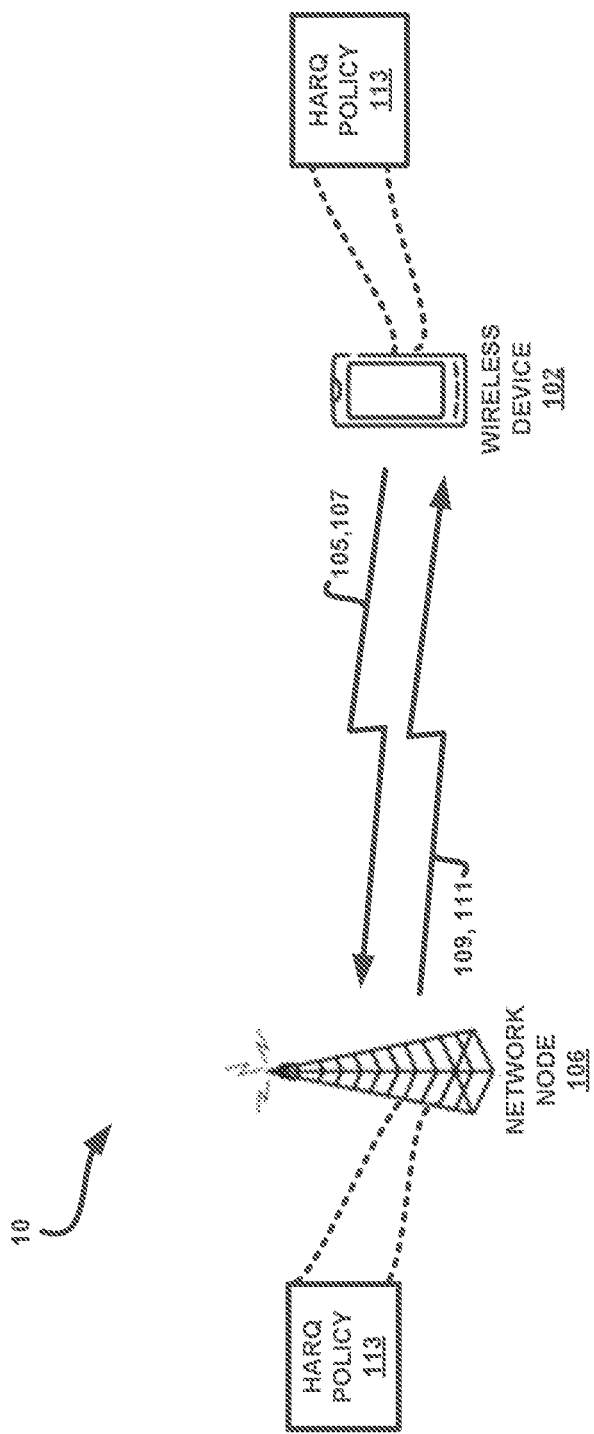
FIG. 1 illustrates a wireless communication system corresponding to example embodiments of the present disclosure.

The present disclosure presents techniques for uplink data transmission and scheduling whereby a timer with a corresponding maximum retransmission time is configured for a wireless device such that when the timer expires, the wireless device can reuse the used HARQ process for transmission of new UL data or for retransmission of all or part of an original transmission. These techniques are based on the reality that there are two possible assumptions if the UE has not received any feedback. First, the wireless device could assume that the original transmission was correctly received (i.e., assumes an ACK) for the TB. Under this first possible assumption, the wireless device could generate and transmit a new TB for the given HARQ process at the next transmission occasion. This scenario would be applicable, for example, where the reliability requirements for receiving the transmission at the network node are not particularly high (e.g., in an enhanced Mobile Broadband (eMBB) use-case).

The other alternative is to assume that the data was not properly received and that a negative acknowledgement (NACK) should have been sent. In this case, the wireless device would generate and transmit the data of the original TB at the next transmission occasion of the HARQ process. This scenario would be applicable, for example, where the reliability requirements for receiving the data transmission at the network node are relatively high (e.g., in an ultra-reliable low latency communications (URLLC) use-case).

In either of these example scenarios, and following either assumption above, in an aspect of the example embodiments presented herein, transmissions and retransmissions can be governed according to a HARQ policy that defines a timer counting a pre-configured maximum feedback time period (T) and/or a default operation (e.g., according to one of the above-recited scenarios and assumptions). This default operation, which can include whether to transmit new data using a particular HARQ ID or to retransmit data that was previously transmitted using the HARQ ID, can be triggered after the timer expires without the transmitting device receiving HARQ feedback from a receiving device. In some examples, the timer could begin counting down the associated time period T when it transmits the original TB data, while in other examples the countdown could start when the wireless device receives the UL resource grant for the original TB data transmission. In addition, as indicated above, the default operation will be triggered in some embodiments where feedback has not been received by the time the timer has expired. This feedback associated with the timer could include an ACK, a NACK, a new data indicator (e.g., new data exists in a transmission queue), or a new resource grant for one or more uplink transmissions.

In a further aspect of some example embodiments, the maximum feedback time period T 205 can be selected or adapted (e.g., by the network node 106 or by another network-side device controlled by a network operator, for examples) based on the number of HARQ processes to be utilized for wireless communication between the wireless device 102 and the network node 106 (or at least for uplink transmissions 105, 107). In some examples, when the number of HARQ processes is relatively small (e.g., based on a threshold number, for instance) the value of the time period for the timer can be set to a relatively low value to allow for reuse of individual HARQ process numbers. Alternatively, where the number of HARQ processes is relatively large, the wireless device 102 can wait longer for a feedback before it must reuse the corresponding HARQ process number for new data, and therefore the time period can be set to a relatively higher value.

Furthermore, as multiple HARQ processes are available for use concurrently (i.e. as in LTE, where eight HARQ processes are available as discussed above), any available HARQ process can be used to transmit new data while waiting for maximum feedback time period T 205 of a particular HARQ ID. Thus, in a further aspect of the present disclosure, each HARQ process can operate its own timer, optionally with a same maximum feedback time period or with different time periods in other examples.

Aspects of these and other possible implementations will now be described in reference to the accompanying figures. FIG. 1 illustrates a wireless communication system 10 that includes a network node 106 and a wireless device 102 in wireless communication over one or more communication channels. As shown, the wireless device 102 is configured to transmit uplink messages to the network node. In an aspect, these uplink transmissions can include an original (e.g., first or earlier in time) TB transmission 105 comprising data and having a HARQ process ID. In addition, the uplink transmissions can include a subsequent TB transmission 107, which, depending on the HARQ policy 113 stored at the wireless device 102 and the network node 106, can include either new data or all or part of the original data for retransmission using the HARQ process ID of the original TB transmission 105.

In addition, as shown in FIG. 1, the network node 106 is configured to transmit downlink messages to the wireless device 102. These downlink messages can include one or more uplink scheduling grants 109, which in some instances can implement SPS techniques (i.e., one uplink scheduling grant 109 being transmitted for every n transmission occasions where n>1). In addition, the downlink transmissions can include configuration information 111, which can include information related to the HARQ processes, such as information needed at the wireless device 102 to carry out the HARQ policy 113. For instance, the configuration information may include a value for the time period T 205 associated with the timer.

Additionally, in some examples, the configuration information can include control or characteristic data gathered by the network node 106 to aid the wireless device 102 in determining the HARQ policy 113 and/or the time period associated with the timer. Such information may include a number of HARQ processes to be utilized by the wireless device 102 in its transmissions to the network node 106, a periodicity of periodic transmission occasions (i.e., how frequently uplink transmission occasions or opportunities are available), a delay tolerance of a service corresponding to data that may be carried by a TB transmitted by the wireless device 102, network load information, a processing time required for the network node to process received uplink transmissions from the wireless device 102, among other factors that may be needed to ensure proper transmission timing and/or HARQ policy selection by the wireless device 102. In an aspect, the selection of the HARQ policy (by wireless device 102, for instance) includes determining whether the wireless device 102 is to retransmit all or part of the TB data transmitted in the original transmission 105 or is to use the HARQ process ID of that original transmission 105 to transmit new data in a TB at a next transmission occasion for that HARQ process if the timer expires without the wireless device 102 having received HARQ feedback for the original TB transmission 105.

Figure 2:
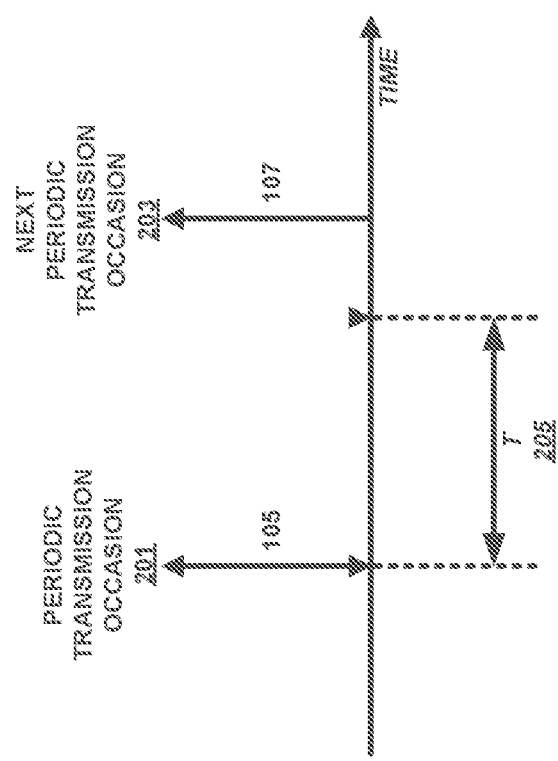
FIG. 2 is an example timing diagram that illustrates aspects of transmission/retransmission timing according to the present disclosure.

FIG. 2 illustrates an example of uplink transmission timing in the wireless communication system 10 of FIG. 1, which allows for functional retransmission operations without using explicit HARQ feedback. In the simplified use-case illustrated in the figure, there is only a single HARQ process used in semi-persistent scheduling. As shown, the wireless device 102 can initially send an original TB transmission 105 at a periodic transmission occasion 201 defined by the corresponding uplink grant (e.g., in an earlier SPS message from the network node 106). In the example shown, the timer 115 is started by the wireless device 102 contemporaneous with the original TB transmission 105 (though in other examples, the timer 115 could be started when the uplink grant for periodic transmission occasion 201 is received by the wireless device 102). After transmitting the original TB and stating the timer 115, the wireless device 102 then waits for a time period T 205 This time period T 205 may be selected by the wireless device 102, preconfigured by a network operator, or assigned by the network node 106.

If the wireless device 102 determines that no HARQ feedback has been received for the original TB transmission 105, the wireless device 102 is configured to, at the next periodic transmission occasion 203 following expiration of the timer, either (a) reuse the HARQ process ID of the original TB transmission 105 to transmit new data in a new TB or (b) retransmit all or part of the original TB transmission 105 using the same HARQ process ID. In an aspect of the present disclosure, this determination regarding whether to transmit new data or retransmit the original data is governed by the HARQ policy 113. Therefore, upon determining that the timer has expired and no HARQ feedback was received, the wireless device 102 takes the action mandated by the HARQ policy 113 in effect at the time. Thus, in some instances, depending on the HARQ policy 113, the TB sent by the wireless device 102 at a next transmission occasion for the relevant HARQ process ID (i.e., the first occasion available for the HARQ process after the timer expires) could be either a retransmission of the original data or a new TB containing new data.

Furthermore, in example embodiments of the present disclosure, the HARQ policy 113 can be determined by the wireless device 102 (and optionally relayed to the network node 106). In some examples, the HARQ policy 113 can be set by the wireless device 102 based on network-side factors such as observed or estimated latency, network load, Quality of Service (QoS) requirements of the service to which the transmitted data pertains or to which the data is to likely pertain, reliability requirements of the underlying service (e.g., eMBB vs. URLCC), and the like.

Figure 3:
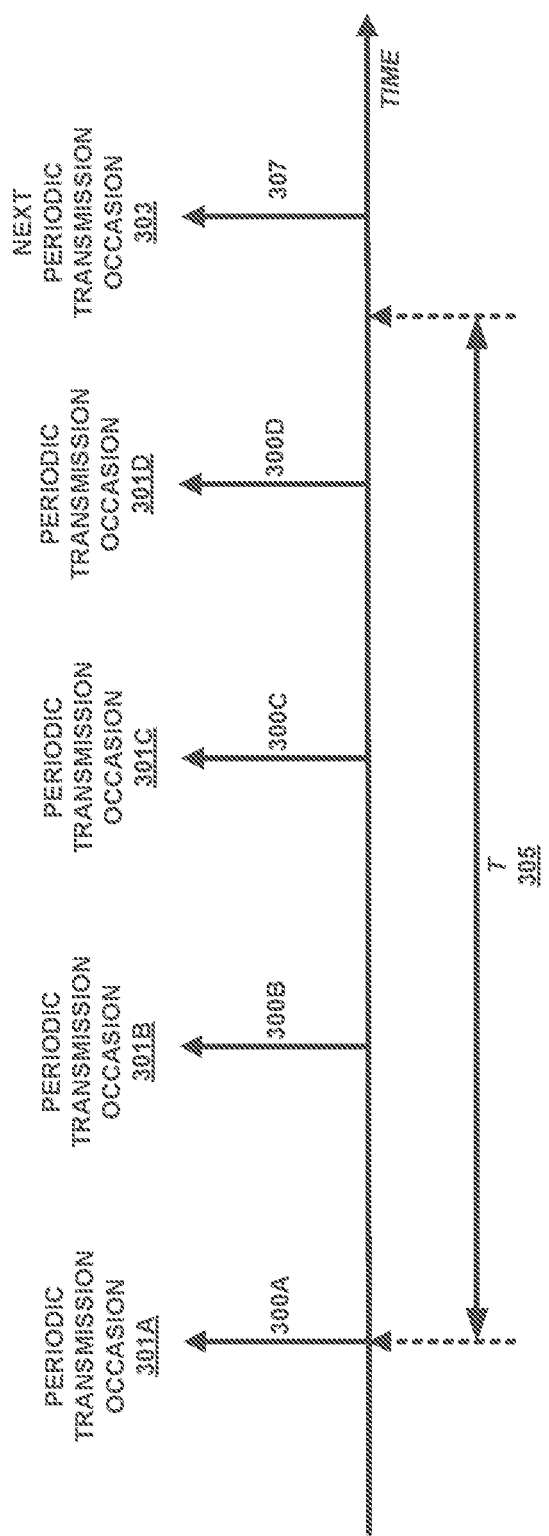
FIG. 3 is another example timing diagram that illustrates aspects of transmission/retransmission timing according to the present disclosure.

Moving on, FIG. 3 shows another example implementation where the number of HARQ processes is four. In this example, the timer time period T 305 is relatively long compared to the time period T 205 of FIG. 2, and as a result, multiple transmission occasions for other HARQ process IDs occur during the time period T 305—namely, TB transmissions 300B, 300C, and 300D at periodic transmission occasions 301B, 301C, and 301D, respectively. For purposes of the present disclosure, although the timer is described as having an associated time period T, the terms meant to be read as interchangeable such that when a timer is referred to, so is a time period T, and vice versa. Returning to the operation of the present solutions, again, as in FIG. 2, upon expiration of the timer after time period T 305 elapses in FIG. 3, the wireless device 102 either retransmits all or part of the data transmitted in the TB of 300A or transmits new data in a TB at the next periodic transmission occasion by reusing the HARQ process ID of the original TB transmission 300A.

As a comparison of FIG. 2 and FIG. 3 shows, the timer can be set (for instance, by the network node 106 or another network-side device) to have an associated time period T 205, 305 that differs based on one or more parameters. For instance, the time period T 205, 305 of the timer can be set based on one or more of the number of HARQ processes to be used by the wireless device 102, a periodicity of the SPS transmission, or a degree of delay-tolerance associated with the service or application corresponding to the data contained in one or more of the uplink TB transmissions 300A-D and 307. The timer could further be configured based on a processing time required by the network node 106 to decode and process received data of a given TB and perform a reliability check on the received data (e.g., cyclic redundancy check (CRC) or the like).

In some instances, the time period T 205, 305 of the timer may additionally or alternatively be set based on the load in the network or network node 106 and/or throughput or QoS metrics mandated by an underlying service. For instance, in an example aspect, If the load is higher in the cell or cells operating on the same network node 106, the network node 106 can configure (or reconfigure) the time period T 205, 305 based on a present (or time-averaged) processing load present at the network node 106, and may further set the time period T such that the network node 106 is able to respond to the wireless device 102 with HARQ feedback within the configured time period T at a rate that is greater than or equal to a threshold value (or is projected to meet the threshold value through extrapolation or similar predictive methods).

Figure 4:
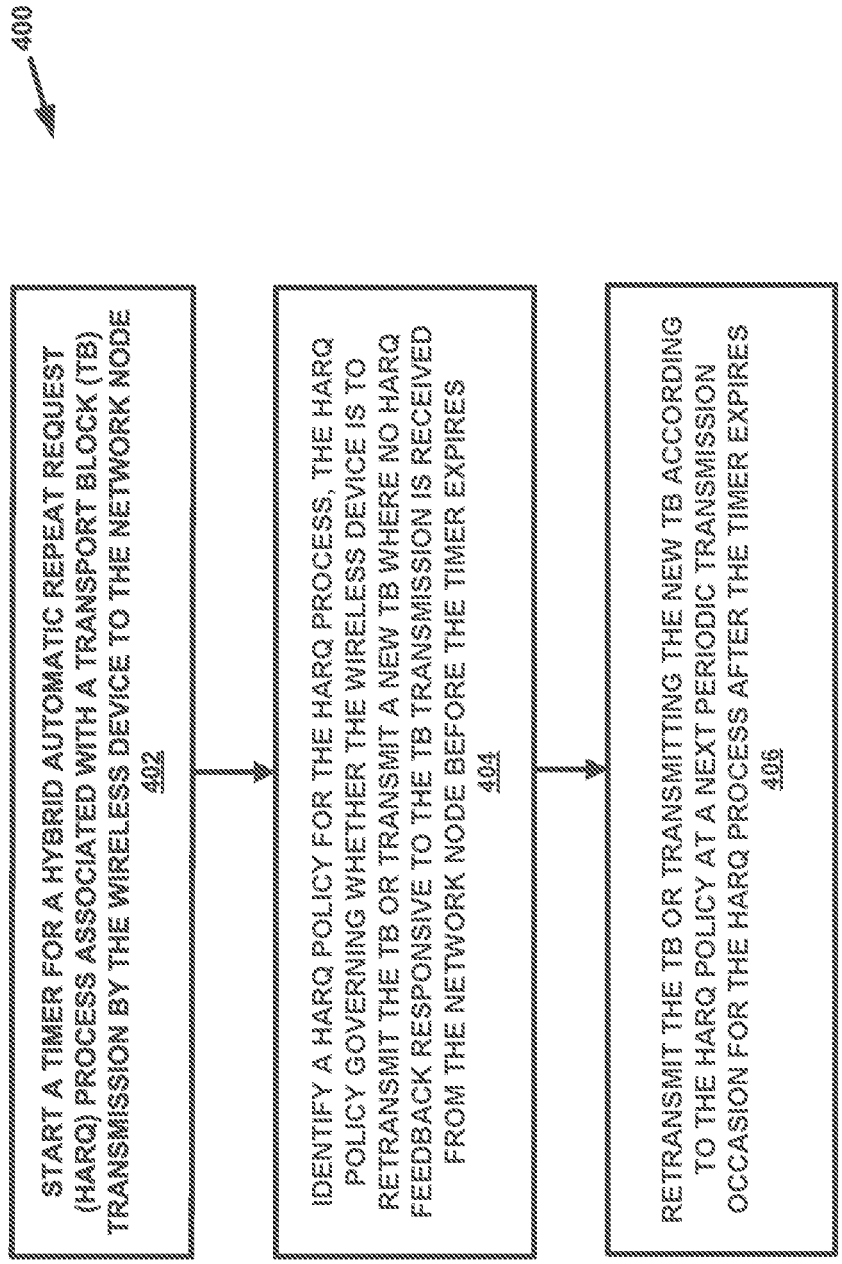
FIG. 4 illustrates a method performed by a wireless device according to one or more embodiments.

Turning to FIG. 4, the figure depicts an example method 400 for managing TB transmissions by the wireless device 102 to a network node 106 at periodic transmission occasions, which can be performed by a wireless device 102 (e.g., a UE) according to some implementations. The method 400 can include, for instance, starting a timer for a HARQ process associated with a transport block transmission by the wireless device 102 to the network node 106 (i.e., original TB data transmissions 105 and 300A of FIGS. 2 and 3, respectively) at block 402. In addition, the example method 400 can include, at block 404, identifying a HARQ policy for the HARQ process, where the HARQ policy governs whether the wireless device 102 is to retransmit the TB or the original transmission 105 or transmit a new TB where no HARQ feedback responsive to the original TB transmission is received from the network node 106 before the timer expires. In addition, the method 400 can include, at block 406, retransmitting the TB or transmitting the new TB according to the HARQ policy at a next periodic transmission occasion for the HARQ process after the timer expires.

Furthermore, although not explicitly shown in FIG. 4, additional or alternative aspects of the present disclosure could be included in method 400 in some embodiments. For instance, as shown in FIG. 3, in some examples of method 400, at least one additional HARQ process (see e.g., items 300B, 300C, 300D) is executed after starting the timer and before the timer expires. In an additional optional aspect of method 400, the time period T associated with the timer can be set (e.g., by the network node 106) according to one or more of: a number of HARQ processes utilized by the wireless device 102, a periodicity of periodic transmission occasions, a delay tolerance of a service corresponding to data carried by the TB and/or the new TB, a processing time of the network node 106, and a network load. In addition, as mentioned above, the timer for a relevant HARQ process can be started upon transmission of the original TB or upon the wireless device 102 receiving an uplink grant from the network node 106 for transmission of the TB. Also, as introduced above, the method 400 can include the wireless device 102 generating the HARQ policy.

Figure 5:
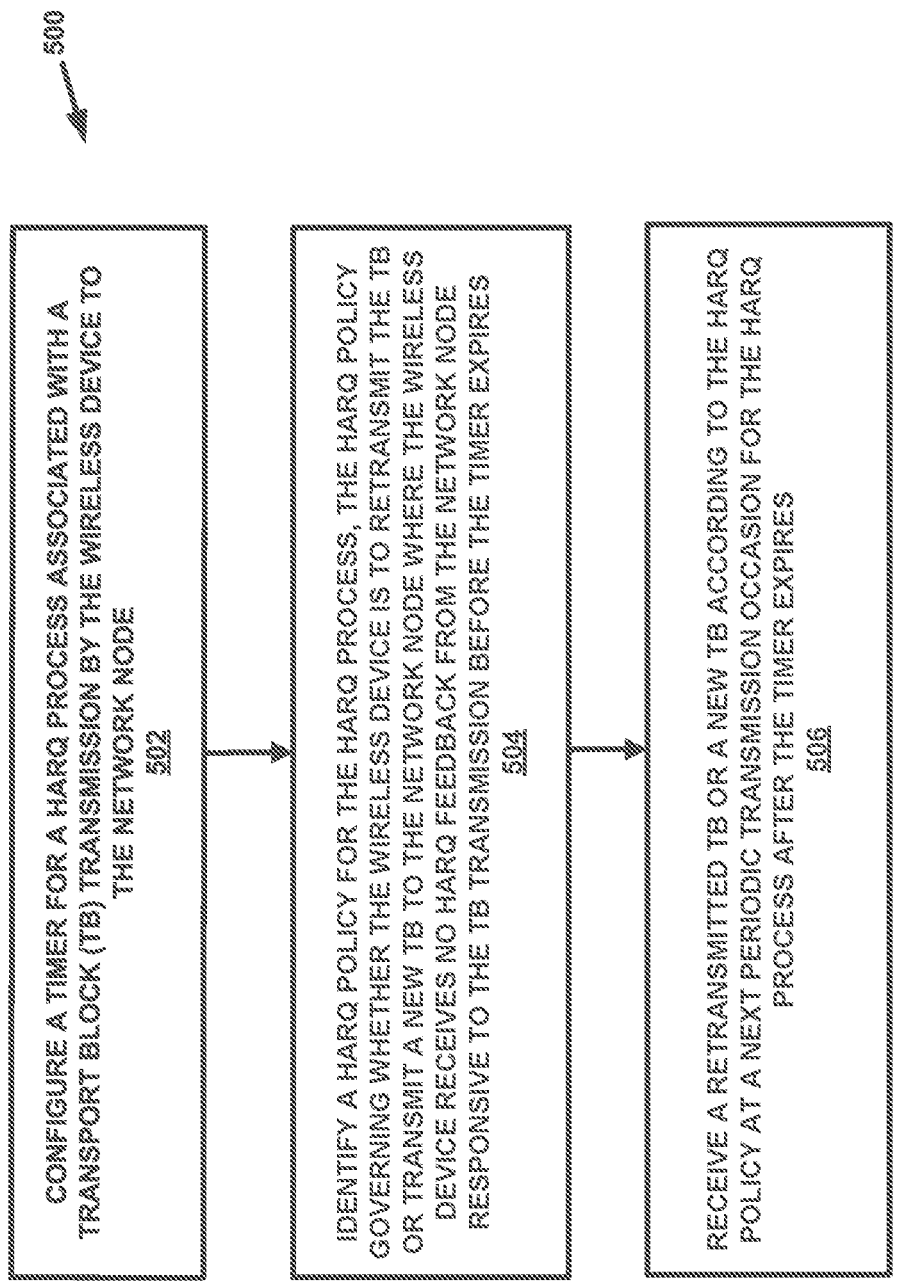
FIG. 5 illustrates a method performed by a network node according to one or more embodiments.

FIG. 5 illustrates an example method 500 performed by a network node for managing TB transmissions by a wireless device 102 to the network node 106 at periodic transmission occasions. In an aspect, method 500 may include, at block 502, configuring a timer for a HARQ process associated with a TB transmission by the wireless device to the network node. In addition, method 500 may include, at block 504, identifying a HARQ policy for the HARQ process, where the HARQ policy governs whether the wireless device 102 is to retransmit the TB or transmit a new TB to the network node 106 in scenarios where the wireless device 102 receives no HARQ feedback from the network node 106 responsive to the TB transmission before the timer expires. Furthermore, at block 506, method 500 may include receiving a retransmitted TB or a new TB according to the HARQ policy at a next periodic transmission occasion for the HARQ process after the timer expires.

Furthermore, although not explicitly shown in FIG. 5, additional or alternative aspects of the present disclosure could be included in method 500 in some embodiments. For instance, in some examples, identifying the HARQ policy at block 504 may also include obtaining the HARQ policy from the wireless device 102, for instance, via control signaling in a stand-alone uplink transmission or via a signal transmitted by the wireless device 102 of any other sort (e.g., higher-level signaling, trailing bits of control or data transmissions by the wireless device, etc.) where the HARQ policy can optionally be indicated in one or more piggybacked bits.

In an additional aspect of some embodiments, identifying the HARQ policy can include setting the HARQ policy at the network node 106, which can be based on one or more of the following non-limiting list of factors: a number of HARQ processes utilized by the wireless device 102, a periodicity of periodic transmission occasions, a delay tolerance and/or a reliability requirement of a service corresponding to data carried by the TB and/or the new TB, a processing time of the network node 106, and a network load. In addition, in some examples, the time period T of the timer can be set by the network node 106 based on one or more of these factors. The method 500 can also include the network node 106 determining that the network load has reached a threshold value and, based on this determination, increasing the time period of the timer.

In a further aspect of the method 500, and the functionality of the network node 106 generally, the network node 106 may be configured to perform error detection on one or more TBs received from the wireless device 102. This can involve, for instance, performing CRC operations or otherwise processing received data using other error detection mechanisms known in the art. Based on the results of these error detection operations, the network node 106 can optionally transmit HARQ feedback to the wireless device assuming the configured HARQ policy allows for such transmissions to the wireless device 102. Leveraging the unique features of the techniques presented herein, the network node 106 can then determine a TB and/or HARQ process that is to be transmitted or retransmitted during a next periodic transmission occasion based on a result of the error detection, the configured HARQ policy, and/or a time at which the HARQ feedback is transmitted to the wireless device 102 or is to be received by the wireless device 102.

Moreover, though not explicitly shown in methods 400 or 500 of FIG. 4 or FIG. 5, respectively, these methods may exhibit further optional aspects in some embodiments. For instance, in method 400 or method 500, the periodic transmission occasions (e.g. 201, 203 of FIG. 2, 300A-300D, 307 of FIG. 3) are defined according to an SPS scheme, which may also be referred to as "UL transmission without dynamic scheduling", "configured grant scheduling," or "configured scheduling."

In a further optional aspect, although the HARQ policy can be selected by the wireless device 102, in some instances, it can alternatively be preconfigured, for instance, by a manufacturer, network operator, a particular radio access technology utilized by the wireless device 102 and the network node 106, or the like. In the same vein, in some instances the HARQ policy may be static, where in other instances it may be dynamic in that it can change over time based on one or more factors, including those discussed above.

In addition, for purposes of the present disclosure, the wireless device 102 can be considered to be a user equipment, though, again, this is not a limiting aspect. Furthermore, in any of the example embodiments of the present disclosure, though not limiting, the network node 106 can be a gNB, eNB, Base Station, 802.11 Access Point, or any other radio access network device in communication with one or more wireless devices 102. In other words, the network node 106, as that term is used herein, is a general term and can correspond to any type of radio network node or any network node which communicates with a wireless device and/or with another network node. Examples of network nodes include, but are not limited to NodeB, base station (BS), multi-standard radio (MSR) radio node such as MSR BS, evolved node B (eNodeB), new generation (5G) node B (gNodeB), macro evolved Node B (MeNB), small evolved Node B (SeNB), network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), core network node (e.g., mobile switching center (MSC), MME, etc.), operations & maintenance (O&M), open storage service (OSS), selforganizing network (SON), positioning node (e.g., evolved serving location center (E-SMLC)), minimizing of driving test (MDT), etc.

Figure 6B:
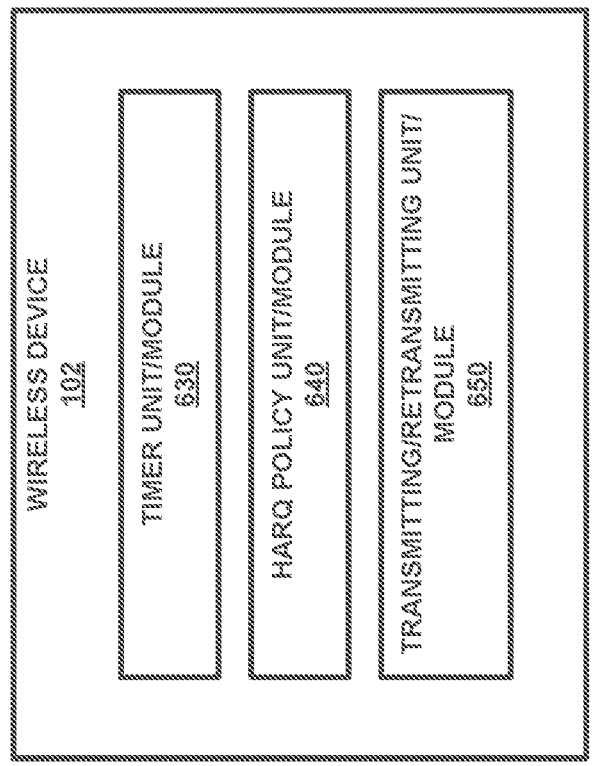
FIGS. 6A and 6B illustrate details of an example wireless device according to one or more embodiments.
Figure 6A:
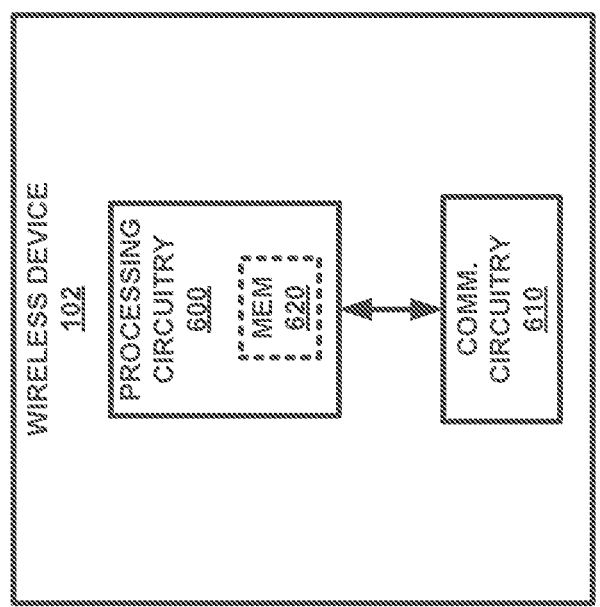

With these devices in mind, let us turn to FIGS. 6A, 6B, 7A, and 7B, which present example aspects of a wireless device 102 and network node 106 that are configured to carry out the techniques and methods presented above. FIG. 6A illustrates additional details of an example wireless device 102 of a wireless communication system 10 according to one or more embodiments. The wireless device 102 is configured, e.g., via functional means or units (also may be referred to as modules or components herein), to implement processing to perform certain aspects described above in reference to at least the aspects of FIGS. 2 and 3 the related methods presented in FIGS. 4 and 5. As shown in FIG. 6B, the wireless device 102 in some embodiments for example includes means, modules, components, or units 630, 640, and 650 (among other possible means, modules, components, or units not shown explicitly in FIG. 6B) for performing aspects of these methods. In some examples, these means, modules, components, or units can be realized in processing circuitry 600. Specifically, the functional means or units of the wireless device 102 may include a timing unit/module 630 configured to start and manage a timer for one or more HARQ processes, such as in block 402 of FIG. 4. In addition, the wireless device 102 can include a HARQ policy unit/module 640 to identify a HARQ policy for one or more HARQ processes governing whether the wireless device 102 is to retransmit a TB or portion thereof, or transmit a new TB where no HARQ feedback responsive to the TB transmission is received from the network node before the timer expires, for example, as performed in block 404 of FIG. 4, above. In addition, wireless device 102 may include a transmitting/retransmitting unit/module for retransmitting a TB or a portion thereof, or transmitting a new TB according to the HARQ policy at a next periodic transmission occasion for the HARQ process after the timer expires, for instance, as performed at block 406 in FIG. 4.

In at least some embodiments, the wireless device 102 comprises one or more processing circuitry/circuits 600 configured to implement processing of the methods presented in FIGS. 4 and 5 and certain associated processing of the features described in relation to other figures, such as by implementing functional means or units above. In one embodiment, for example, the processing circuit(s) 600 implements functional means or units as respective circuits. The circuits in this regard may comprise circuits dedicated to performing certain functional processing and/or one or more microprocessors in conjunction with memory 620. In embodiments that employ memory 620, which may comprise one or several types of memory such as read-only memory (ROM), random-access memory, cache memory, flash memory devices, optical storage devices, etc., the memory 620 stores program code that, when executed by the one or more for carrying out one or more microprocessors, carries out the techniques described herein.

In one or more embodiments, the wireless device 102 also comprises communication circuitry 610. The communication circuitry 610 includes various components (e.g., antennas) for sending and receiving data and control signals. More particularly, the circuitry 610 includes a transmitter that is configured to use known signal processing techniques, typically according to one or more standards, and is configured to condition a signal for transmission (e.g., over the air via one or more antennas). Similarly, the communication circuitry includes a receiver that is configured to convert signals received (e.g., via the antenna(s)) into digital samples for processing by the one or more processing circuits.

Figure 7B:
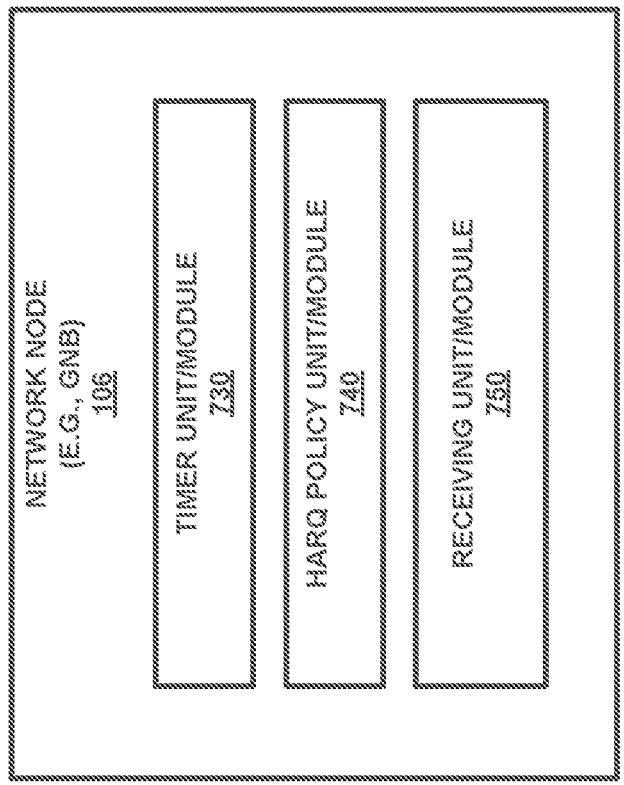
FIGS. 7A and 7B illustrate details of an example network node according to one or more embodiments.
Figure 7A:
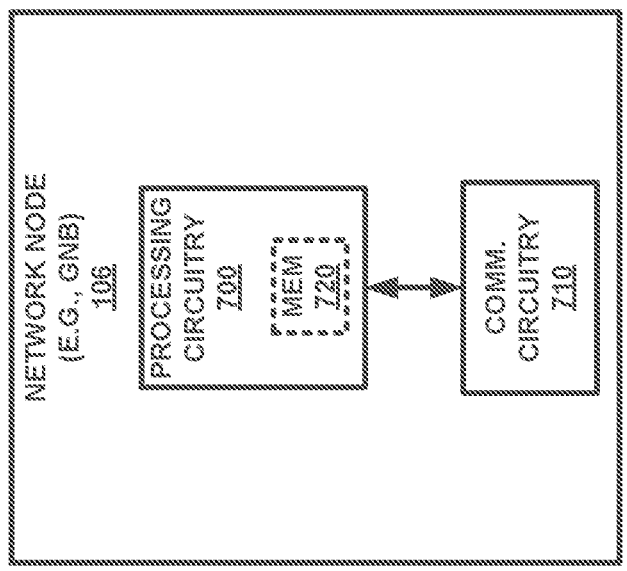

FIG. 7A illustrates additional details of an example network node 106 of a wireless communication system 10 according to one or more embodiments. The network node 106 is configured, e.g., via functional means or units (also may be referred to as modules or components herein), to implement processing to perform certain aspects described above in reference to at least the aspects of FIGS. 2 and 3 the related methods presented in FIGS. 4 and 5. As shown in FIG. 7B, the network node 106 in some embodiments for example includes means, modules, components, or units 730, 740, and 750 (among other possible means, modules, components, or units not shown explicitly in FIG. 7B) for performing aspects of these methods. In some examples, these means, modules, components, or units can be realized in processing circuitry 700. Specifically, the functional means or units of the network node 106 may include a timing unit/module 730 configured to configure a timer and/or a time period associated with the timer for a HARQ process associated with a TB transmission by a wireless device 102 to the network node 106, such as in block 502 of FIG. 5. In addition, the network node 106 can include a HARQ policy unit/module 740 to identify a HARQ policy for one or more HARQ processes governing whether the network node 106 is to retransmit a TB or portion thereof, or transmit a new TB where no HARQ feedback responsive to the TB transmission is received from the network node before the timer expires, for example, as performed in block 504 of FIG. 5, above. In addition, network node 106 may include a receiving unit/module for receiving a retransmitted TB or a portion thereof, or receiving a new TB according to the HARQ policy at a next periodic transmission occasion for the HARQ process after the timer expires, for instance, as performed at block 506 in FIG. 5.

In at least some embodiments, the network node 106 comprises one or more processing circuitry/circuits 700 configured to implement processing of the methods presented in FIGS. 4 and 5 and certain associated processing of the features described in relation to other figures, such as by implementing functional means or units above. In one embodiment, for example, the processing circuit(s) 700 implements functional means or units as respective circuits. The circuits in this regard may comprise circuits dedicated to performing certain functional processing and/or one or more microprocessors in conjunction with memory 720. In embodiments that employ memory 720, which may comprise one or several types of memory such as read-only memory (ROM), random-access memory, cache memory, flash memory devices, optical storage devices, etc., the memory 720 stores program code that, when executed by the one or more for carrying out one or more microprocessors, carries out the techniques described herein.

In one or more embodiments, the network node 106 also comprises communication circuitry 710. The communication circuitry 710 includes various components (e.g., antennas) for sending and receiving data and control signals. More particularly, the circuitry 710 includes a transmitter that is configured to use known signal processing techniques, typically according to one or more standards, and is configured to condition a signal for transmission (e.g., over the air via one or more antennas). Similarly, the communication circuitry includes a receiver that is configured to convert signals received (e.g., via the antenna(s)) into digital samples for processing by the one or more processing circuits.

Those skilled in the art will also appreciate that embodiments herein further include corresponding computer programs. A computer program comprises instructions which, when executed on at least one processor of the network node 106 or wireless device 102, cause these devices to carry out any of the respective processing described above. Furthermore, the processing or functionality of network node 106 or wireless device 102 may be considered as being performed by a single instance or device or may be divided across a plurality of instances of network node 106 or wireless device 102 that may be present in a given system such that together the device instances perform all disclosed functionality.

In an aspect, the wireless device 102 may correspond to any mobile (or even stationary) device that is configured to receive/consume user data from a network-side infrastructure, including laptops, phones, tablets, IoT devices, etc. As recited above, the network node 106 may be any network device, such as a base station, eNB, gNB, access point, or any other similar device.

Embodiments further include a carrier containing such a computer program. This carrier may comprise one of an electronic signal, optical signal, radio signal, or computer readable storage medium. A computer program in this regard may comprise one or more code modules corresponding to the means or units described above.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method performed by a wireless device for managing transport block (TB) transmissions by the wireless device to a network node at periodic transmission occasions, the method comprising:
starting a retransmission timer for a hybrid automatic repeat request (HARQ) process upon a first transport block (TB) transmission by the wireless device to the network node;
applying a HARQ policy for the HARQ process, the HARQ policy governing whether the wireless device is to retransmit the first TB or transmit a second TB where no HARQ feedback responsive to the first TB transmission is received from the network node before the retransmission timer expires; and
retransmitting the first TB or transmitting the second TB according to the HARQ policy at a next periodic transmission occasion for the HARQ process after the retransmission timer expires, wherein the HARQ process is one of a plurality of concurrent HARQ processes.

2. The method of claim 1, wherein the HARQ feedback is an acknowledgement message (ACK), a negative acknowledgement message (NACK), a new data indicator, or a new uplink transmission grant.

3. The method of claim 1, wherein a time period associated with the retransmission timer is set according to one or more of: a number of HARQ processes utilized by the wireless device, a periodicity of periodic transmission occasions, a delay tolerance of a service corresponding to data carried by the first TB and/or the second TB, a processing time of the network node, and a network load.

4. The method of claim 1, wherein the retransmission timer for the HARQ process is started upon transmission of the first TB or upon the wireless device receiving an uplink grant from the network node for transmission of the first TB.

5. A method performed by a network node for managing transport block (TB) transmissions by a wireless device to the network node at periodic transmission occasions, the method comprising:
configuring a retransmission timer for a hybrid automatic repeat request (HARQ) process for a transport block (TB) transmission by the wireless device to the network node;
applying a HARQ policy for the HARQ process, the HARQ policy governing whether the wireless device is to retransmit the first TB or transmit a second TB to the network node where the wireless device receives no HARQ feedback from the network node responsive to the first TB transmission before the retransmission timer expires; and
receiving a retransmitted TB or a second TB according to the HARQ policy at a next periodic transmission occasion for the HARQ process after the retransmission timer expires, wherein the HARQ process is one of a plurality of concurrent HARQ processes.

6. The method of claim 5, wherein identifying the HARQ policy comprises setting the HARQ policy at the network node based on one or more of: a number of HARQ processes utilized by the wireless device, a periodicity of periodic transmission occasions, a delay tolerance and/or a reliability requirement of a service corresponding to data carried by the first TB and/or the second TB, a processing time of the network node, and a network load.

7. The method of claim 5, wherein configuring the retransmission timer is based on one or more of: a number of HARQ processes utilized by the wireless device, a periodicity of periodic transmission occasions, a delay tolerance of a service corresponding to data carried by the first TB and/or the second TB, and a processing time of the network node.

8. The method of claim 5, wherein a time period of the retransmission timer is set based on a network load, and further comprising:
determining that the network load has reached a threshold value; and
increasing the time period of the retransmission timer based on determining that the network I has reached the threshold value.

9. The method of claim 5, for performing error detection on one or more TBs received from the wireless device further comprising:
transmitting HARQ feedback to the wireless device based on the performed error detection and the configured HARQ policy; and
determining a TB and/or HARQ process to be transmitted or retransmitted during the next periodic transmission occasion based on a result of the error detection, the configured HARQ policy, and/or a time at which the HARQ feedback is transmitted to the wireless device or is to be received by the wireless device.

10. A wireless device configured to manage transport block (TB) transmissions by the wireless device to a network node at periodic transmission occasions, the wireless device comprising at least one processor and a memory, the memory storing instructions that, when executed by the at least one processor, cause the wireless device to:
start a retransmission timer for a hybrid automatic repeat request (HARQ) process associated with a transport block (TB) transmission by the wireless device to the network node;

applying a HARQ policy for the HARQ process, the HARQ policy governing whether the wireless device is to retransmit the first TB or transmit a second TB where no HARQ feedback responsive to the first TB transmission is received from the network node before the retransmission timer expires; and retransmit the first TB or transmitting the second TB according to the HARQ policy at a next periodic transmission occasion for the HARQ process after the retransmission timer expires, wherein the HARQ process is one of a plurality of concurrent HARQ processes.

11. The wireless device of claim 10, wherein the HARQ feedback is an acknowledgement message (ACK), a negative acknowledgement message (NACK), a new data indicator, or a new uplink transmission grant.

12. The wireless device of claim 10, wherein a time period associated with the retransmission timer is set according to one or more of: a number of HARQ processes utilized by the wireless device, a periodicity of periodic transmission occasions, a delay tolerance of a service corresponding to data carried by the first TB and/or the second TB, a processing time of the network node, and a network load.

13. The wireless device of claim 10, wherein the retransmission timer for the HARQ process is started upon transmission of the first TB or upon the wireless device receiving an uplink grant from the network node for transmission of the first TB.

14. A network node for managing transport block (TB) transmissions by a wireless device to the network node at periodic transmission occasions, the network node comprising at least one processor and a memory, the memory storing instructions that, when executed by the at least one processor, cause the network node to:

configure a retransmission timer for a hybrid automatic repeat request (HARQ) process associated with a transport block (TB) transmission by the wireless device to the network node;

identify a HARQ policy for the HARQ process, the HARQ policy governing whether the wireless device is to retransmit the first TB or transmit a second TB to the network node where no HARQ feedback responsive to the first TB transmission is received from the network node before the retransmission timer expires; and receive a retransmitted TB or a second TB according to the HARQ policy at a next periodic transmission occasion for the HARQ process after the retransmission timer expires, wherein the HARQ process is one of a plurality of concurrent HARQ processes.

15. The network node of claim 14, wherein the HARQ policy is set based on one or more of: a number of HARQ processes utilized by the wireless device, a periodicity of periodic transmission occasions, a delay tolerance and/or a reliability requirement of a service corresponding to data carried by the first TB and/or the second TB, a processing time of the network node, and a network load.

16. The network node of claim 14, wherein configuring the retransmission timer is based on one or more of: a number of HARQ processes utilized by the wireless device, a periodicity of periodic transmission occasions, a delay tolerance of a service corresponding to data carried by the first TB and/or the second TB, and a processing time of the network node.

17. The network node of claim 14, wherein a time period of the retransmission timer is set based on a network load, and wherein the network node is further configured to:

determine that the network load has reached a threshold value; and increase the time period of the retransmission timer based on determining that the network node has reached the threshold value.

18. The network node of claim 14, wherein the network node is further configured to:

perform error detection on one or more TBs received from the wireless device;

transmit HARQ feedback to the wireless device based on the performed error detection and the configured HARQ policy; and determine a TB and/or HARQ process to be transmitted or retransmitted during the next periodic transmission occasion based on a result of the error detection, the configured HARQ policy, and/or a time at which the HARQ feedback is transmitted to the wireless device or is to be received by the wireless device.

* * * * *

UNITED STATES PATENT AND TRADEMARK OFFICE
CERTIFICATE OF CORRECTION

PATENT NO. : 11,943,058 B2
APPLICATION NO. : 17/985749
DATED : March 26, 2024
INVENTOR(S) : Zou et al.

It is certified that error appears in the above-identified patent and that said Letters Patent is hereby corrected as shown below:

In the Specification

In Column 1, Line 9, delete "2019," and insert -- 2019, now Pat. No. 11,502,784, --, therefor.

In Column 1, Lines 9-10, delete "PCT/I62018/050741," and insert -- PCT/IB2018/050741, --, therefor.

In Column 8, Line 67, delete "open storage service (OSS)," and insert -- object storage service (OSS), --, therefor.

In Column 9, Lines 1-2, delete "evolved serving location center (E-SMLC))," and insert -- evolved serving mobile location center (E-SMLC)), --, therefor.

In Column 9, Lines 2-3, delete "minimizing of driving test (MDT)," and insert -- minimization of driving test (MDT), --, therefor.

In the Claims

In Column 11, Line 56, in Claim 2, delete "acknowledgement message (ACK)," and insert -- acknowledgement (ACK) message, --, therefor.

In Column 11, Lines 56-57, in Claim 2, delete "negative acknowledgement message (NACK)," and insert -- negative acknowledgement (NACK) message, --, therefor.

In Column 12, Line 44, in Claim 8, delete "network I" and insert -- network load --, therefor.

In Column 13, Line 15, in Claim 11, delete "acknowledgement message (ACK)," and insert -- acknowledgement (ACK) message, --, therefor.

Signed and Sealed this
Twenty-fifth Day of June, 2024

Katherine Kelly Vidal

Katherine Kelly Vidal
*Director of the United States Patent and Trademark Office*

CERTIFICATE OF CORRECTION (continued)
U.S. Pat. No. 11,943,058 B2

In Column 13, Lines 15-16, in Claim 11, delete "negative acknowledgement message (NACK)," and insert -- negative acknowledgement (NACK) message, --, therefor.